US005286979A

United States Patent [19]

Berliner et al.

[11] Patent Number: 5,286,979

[45] Date of Patent: Feb. 15, 1994

[54] PROCESS FOR ABSORBING ULTRAVIOLET RADIATION USING DISPERSED MELANIN

[76] Inventors: David L. Berliner, 380 Selby La.; Helen Leong, 146 Atherton Ave., both of Atherton, Calif. 94027

[21] Appl. No.: 73,284

[22] Filed: Jun. 7, 1993

Related U.S. Application Data

[63] Continuation of Ser. No. 878,716, May 4, 1992, abandoned.

[51] Int. Cl.[5] .............................................. G21K 3/00

[52] U.S. Cl. .............................. 250/515.1; 250/505.1; 359/358; 359/361

[58] Field of Search .......................... 250/515.1, 505.1; 359/358, 361

[56] References Cited

U.S. PATENT DOCUMENTS

| | | | |
|---|---|---|---|
| 1,784,157 | 12/1930 | Oglesby et al. . | |
| 3,019,989 | 2/1962 | Vonnegut | 239/2 |
| 3,084,024 | 4/1963 | Hamilton et al. | 23/4 |
| 3,126,155 | 3/1964 | Lohse | 239/14 |
| 3,429,507 | 2/1969 | Jones | 239/2 |
| 3,558,005 | 1/1971 | Crabtree et al. | 221/90 |
| 3,608,810 | 9/1971 | Kooser | 239/2 R |
| 3,608,820 | 9/1971 | Kooser | 239/2 R |
| 3,802,624 | 4/1974 | Kühne et al. | 239/2 R |
| 4,036,115 | 7/1991 | Gallas | 523/106 |
| 4,412,654 | 11/1983 | Yates et al. | 239/171 |
| 4,686,605 | 8/1987 | Eastlund | 361/231 |
| 4,698,374 | 10/1987 | Gallas | 523/106 |
| 4,806,360 | 2/1989 | Leong et al. | 424/487 |
| 4,855,144 | 8/1989 | Leong et al. | 424/487 |
| 4,948,050 | 8/1990 | Picot | 239/171 |
| 4,961,754 | 10/1990 | Grollier | 8/423 |
| 5,003,186 | 3/1991 | Chang et al. | 250/505.1 |
| 5,047,447 | 9/1991 | Gallas | 359/361 |

OTHER PUBLICATIONS

Cicerone et al., "Reduced antarctic ozone depletions in a model with hydrocarbon injections" *Science* (1991) 254:1191-1194.

Bylinsky, G., "Mass-producing nature's sunscreen" *Fortune* (Jun. 1, 1992) pp. 131.

Bishop, J. E., "Melanin products may be the way to block sun's rays" *The Wall Street Journal* (Aug. 26, 1988) 2 pages total.

Lowe, et al., eds., *Sunscreens: development, evaluation, and regulatory aspects* Marcel Dekker, Inc., New York, pp. 127-129, 137-142.

Waters, J., "Biosource Genetics Corp. turns plants into living biopolymer factories" *Genetic Engineering News* (Sep. 1988) 2 pages total.

*Primary Examiner*—Jack I. Berman

*Attorney, Agent, or Firm*—Morrison & Foerster

[57] ABSTRACT

This invention is a process for absorbing ultraviolet radiation in the atmosphere by dispersing melanin, its analogs, or derivatives into the atmosphere. By appropriate choice of melanin composition, size of melanin dispersoids, and their concentration, the melanin will absorb some quantity of ultraviolet radiation and thereby lessen its overall effect on the critters who would normally absorb such radiation.

14 Claims, No Drawings

PROCESS FOR ABSORBING ULTRAVIOLET RADIATION USING DISPERSED MELANIN

This application is a continuation of application Ser. No. 7/878,716, filed May 4, 1992, now abandoned.

FIELD OF THE INVENTION

This invention is a process for absorbing ultraviolet radiation in the atmosphere by dispersing melanins, their analogs, or derivatives into the atmosphere. By appropriate choice of melanin composition, size of melanin dispersoids, and their concentration, the melanins will absorb some quantity of ultraviolet radiation and thereby lessen its overall effect on the inhabitants on the Earth's surface who would normally encounter such radiation.

BACKGROUND OF THE INVENTION

This invention is a process for the introduction of melanins, neat, solvated, suspended, encapsulated, or otherwise introduced as a fine dispersion of melanin containing compositions to act as absorbers of ultraviolet radiation. Depending upon melanin chosen and the method of introducing it into the atmosphere, the melanin will absorb variously UVA, UVB, or UVC ultraviolet radiation.

Ozone is a form of oxygen found in trace quantities throughout the atmosphere; the highest concentrations are located in a layer of the lower stratosphere found between the altitudes of 45,000 feet and 90,000 feet. Ozone found in the high atmosphere is typically produced by the dissociation of molecular oxygen and at the lower atmosphere or surface is produced by the dissociation of nitrogen oxides. The energy for such dissociation is supplied by solar ultraviolet radiation.

At the earth's surface, ozone is a pollutant which can be harmful to the respiratory system, hastens oxidation of paints, tires, and whatever else may be found in its path. Ozone also plays an important part in the formation of photochemical smog. In the upper atmosphere, the trace amount of ozone absorbs much of the ultraviolet radiation having a wavelength between 240 and 320 nanometers. This radiation is lethal to such organisms as algae and bacteria and damages the surface cells of higher plants and animals. It is responsible for the sunburn of human skin and otherwise damages the DNA material of those cells. High skin cancer incidence is also observed where the surface intensities of ultraviolet light having a wavelength of 290 and 320 nanometers are found. These ultraviolet wavelengths are not completely absorbed by the ozone layer.

Although the ozone layer in the upper atmosphere has been studies since the early 1950s, the thinning of this protective layer was not considered serious until a sudden decrease in the thickness in the layer by 3% was discovered in the 1970s. There has been concern that supersonic aircraft designed to fly in the lower stratosphere (such as the Concorde) produce $NO_x$ in their engines by the thermal decomposition and recombination of the nitrogen and oxygen in the air.

Initial computations suggested that the presence of this $NO_x$ would result in significant depletion of stratospheric ozone. However, later chemical studies have determined that supersonic aircraft have a very much smaller effect on stratospheric ozone than originally thought.

An additional concern has been voiced that the use of various Freons, in particular $CFCl_3$ and $CF_2Cl_2$, cause depletion of ozone through their decomposition (through contact with ultraviolet light) and dissociation into lower chlorofluorocarbons and monochlorine. The chlorine singlet reacts with the ozone to produce oxygen. Freon chlorofluorocarbons are in the process of being phased out but are currently used as refrigerants, as blowing or foaming agents for plastic foams, and as aerosol can propellants. Some computational chemical models predict that chlorofluoromethanes are responsible for between 1% and 7% decrease in stratospheric ozone concentration during the next few years.

Other causes may produce substantial effects in ozone production or destruction; increases in $CO_2$ due to combustion of fossil fuels may lead to a cooling of the stratosphere and thus a decrease in the rate of ozone destruction. But whatever the cause, significant downward changes in the concentration of ozone in that layer will increase the incidence of various ultraviolet light wavelengths at the Earth's surface.

This invention is a method for at least a partial alleviation of some of the consequences of that ozone layer depletion.

The use of melanin to protect human skin is known. Particularly, U.S. Pat. Nos. 4,806,360 and 4,855,144, to Leong et al., show variously melanin-containing compositions made of small polymeric particles and methods of producing the particles. The resulting compositions may be used as sunscreens in a variety of products such as sunscreen products per se or as a component of cosmetic compositions.

U.S. Pat. No. 4,961,754 to Grollier, shows a powder containing very small, inert, inorganic particles having on their surface melanin pigments resulting from the oxidation of an indole dye of a specific formula.

Other uses for melanin are in protecting human eyes from ultraviolet radiation. For instance, U.S. Pat. Nos. 4,698,374; 5,036,115; and 5,047,447 all to Gallas, show a variety of devices, primarily optical devices such as sun glasses using melanin incorporated in a layer of the lens or device.

None of these disclosures suggests the use of finely dispersed melanin in the atmosphere to protect those beneath the melanin dispersion or cloud.

A variety of materials have been introduced into the atmosphere for an equally wide variety of reasons. For instance, U.S. Pat. No. 3,608,810 and 3,608,820, both to Kooser, suggest the concept of dispensing surfactants, salts, water-soluble poly-electrolytes, or mixtures thereof to disperse fogs or to cause rain. Similarly, U.S. Pat. No. 3,802,624 to Kuhne et al., suggests the use of a combination of sugar alcohols, saccharides, and polyvinyl alcohol in combination with low melting point alkane-diols, triols, or polyols. The mixture is sprayed into fog or clouds in a finely-dispersed form to either coalesce fog or dispel clouds.

A classic silver iodide cloud seeding generator is shown in U.S. Pat. No. 3,126,155 to Lohse. The device operates by using a method similar to that found in a carburetor. A fluid under pressure is introduced into a venturi. The air flowing through the venturi is accelerated and disperses the silver iodide-containing solution into small droplets.

In Cicerone et al., "Reduced Ozone Depletions in a Model with Hydrocarbon Injections", *Science* 254, pp.1191-1194 (1991), the concept of introducing hydrocarbons into the upper atmosphere is found. This is said to be a method for removing active chlorine from the atmosphere. Chlorine singlets are believed to result in reaction of ozone to form oxygen.

In Chang et al., U.S. Pat. No. 5,003,186, is described a process for introducing Welsbach materials and metal oxides which have high emissivities (and hence low reflectivities) into the atmosphere. Such particles would absorb long wavelength energy and radiate it into space.

Another venturi passage used for atmospheric seeding is shown in U.S. Pat. No. 3,429,507 to Jones. Other known methods for dispersing materials into the atmosphere include those shown in U.S. Pat. No. 4,412,654 to Yates et al., and 4,948,050 to Picot. The Yates patent shows an airfoil-shaped body which has an open slot at the trailing edge. Located within the interior of the airfoil is a distributor having a series of small orifices which spray droplets toward the trailing edge of the airfoil with its open slot. As the dispersed liquid leaves the slot it is even further comminuted into much smaller droplets.

The Picot patent shows a rotary liquid spray atomizer for aerial spraying. The atomizer is driven by a variable speed motor which may be driven by a variable speed AC generator.

None of the methods or devices suggested for dispersing materials into the atmosphere suggests dispersing melanin for any purpose.

SUMMARY OF THE INVENTION

This invention is to a process for dispersing melanins incorporated into microsize microspheres into the atmosphere at a level below the ozone layer to absorb UV rays, particularly those having a wavelength of 250–400 nanometers and more particularly those at 320–400 nanometers, coming through the ozone layer before they reach the Earth's surface.

MELANINS

Melanins are a major class of broad-spectrum ultraviolet-absorbing organic polymers found naturally in the human epidermis. For the purposes of this invention they are defined and classified as in the work *Melanins* by R.A. Nicolaus, 1968 (Paris, France). Melanins are typically formed in the epidermis by the enzymatic conversion of L-tyrosine into L-3,4-dihydroxyphenyl alanine, commonly referred to as L-dopa. The L-dopa is then further converted into melanin by known biologic pathways. The primary class of melanins produced in the human epidermis is eumelanins. Members of this class are characterized by a black-brown color which is derived from tyrosine. Pheomelanins are the second class of melanins, characterized by reddish-brown color and containing cysteine-derived units in addition to tyrosine-derived units.

A third group of melanins, allomelanins (the word itself meaning "other melanins"), are formed from nitrogen-free precursors, primarily catechol, and 1,8-dihydroxynaphthalenes. Quinones are the usual intermediates in allomelanin synthesis.

Melanins particularly suitable for use in the process of this invention include any of the wide variety of black-brown and reddish-brown polymers of indole 5,6-quinone and 5,6-dihydroxyindole to carboxylic acid which occur naturally in the skin, hair, retina and elsewhere in humans, as well as in a variety of other organisms. In particular, eumelanins, which are black-brown polymers composed mainly of tyrosine-derived units and a few pheomelanins, which are composed of cysteine-derived units in addition to tyrosine-derived units are each suitable. Melanin precursors may include but are not limited to tyrosine, L-dopa, D-dopa, catechol, 5-hydroxyindole, tyramine, dopamine, m-aminophenol, o-aminophenol, p-aminophenol, 4-aminocatechol, 2-hydroxyl-1,4-naphthaquinone, 4-metholcatechol, 3,4-dihydroxynaphthalene, gallic acid, resorcinol, 2-chloroaniline, p-chloroanisole, 2-amino-p-cresol, 4,5-dihydroxynaphthalene, 2,7-disulfonic acid, o-cresol, m-cresol, p-cresol, and other related substances which are capable of being oxidized to tan, brown or black compounds capable of absorbing ultraviolet radiation. Combinations of precursors are also suitable.

The melanins may be dispersed in pure form. However, several melanins are somewhat viscous and hard to handle. If used without a solid carrier, they are preferably dissolved in a suitable aqueous solvent solution. They may also be suspended in a suitable liquid.

Since the preferred size of the melanin-containing particles introduced into the atmosphere is between 0.5 and 100 microns, preferably 0.5 to 50 microns and most preferably from 0.5 to 10 microns, the melanins may be incorporated in a solid carrier, either resin-type or of a polymeric base. Processes for producing suitable polymeric particles including melanin compositions are shown in U.S. Pat. Nos. 4,806,360 and 4,855,140, to Leong et al., discussed above, the entirety of which are incorporated by notice.

The 4,806,360 patent discloses a process for producing polymer beads having average diameters from about 5 to about 100 microns. The cross-linked polymer beads are produced either from polyethylenically saturated monomers, i.e., those having at least two sites of saturation, or from monoethylenically saturated monomers in the presence of one or more polyethylenically unsaturated monomers. In the latter case, the percentage of cross-linking is controlled by balancing the relative amounts of monoethylenically unsaturated monomer and polyethylenically unsaturated monomer. Though a variety of polyolefinic polymer beads are suitable for encapsulating the melanins, a particularly desirable polymer bead is formed by the copolymerization of methyl methacrylate and ethyleneglycol dimethyl methacrylate.

The 4,85,144 patent discloses the use of polymeric particles which have rigid structures having a substantially non-collapsible pore structure. The particles made according to this invention are especially desirable in that the beads are very easy to handle and may be dispensed and dispersed into the atmosphere with great ease. The most desirable polymer bead is produced from copolymerization of methyl methacrylate and ethylene glycol methyl methacrylate as was the 4,806,360 patent particle. Both 4,806,360 and 4,855,144 patents teach processes for including the melanin into the polymeric beads.

Other appropriate physical forms for the melanin particles include encapsulated melanins and vesicles or liposome-type particles. Methods of producing these particles are well-known.

PROCESS

The melanin, solution or suspension of melanins, or polymer supported melanins are dispersed at an appropriate altitude, e.g., 35,000 to 45,000 feet, using known methods of introducing the melanin containing moiety into the atmosphere. The concentration of melanin-containing materials need not be high since they are ideally introduced merely to counteract the thinning of the ozone layer in a particular area. The method of introducing these materials is not especially critical so long as they are dispersed in the size range in which they will remain in the atmosphere for significant periods of time. As noted above, the use of particles in the range of 0.5 to 100 microns will assure such suspension. Methods for producing particles of that size are discussed above and the processes for distributing the melanins, be they neat liquid, solvated liquid, in a suspension, or supported in the polymeric materials discussed above are known. The processes for distributing any of these compositions are known and suitable ones were discussed above in the Background of the Invention.

The invention has been described in some detail by way of illustration for the purposes of understanding its scope. However, it should be apparent that certain changes within the scope of the appended claims and their equivalents will be within the breadth of the invention as described.

We claim as our invention:

1. A method for absorbing ultraviolet radiation in the atmosphere comprising the step of introducing a dispersed composition comprising melanins into the path of the ultraviolet radiation.

2. The method of claim 1 where the dispersed composition comprises neat melanins.

3. The method of claim 1 where the dispersed composition comprises melanin solution.

4. The method of claim 1 where the dispersed composition comprises a melanin suspension.

5. The method of claim 1 where the dispersed composition comprises particles containing melanin.

6. The method of claim 5 where the dispersed composition comprises a polymeric particle comprising melanin.

7. The method of claim 1 where the dispersed composition comprises a particle size of 0.5-100 microns.

8. The method of claim 6 where the polymeric particles are polymeric beads having an average diameter between about 0.5 microns to 50 microns.

9. The method of claim 8 where the polymeric beads have an average diameter in the range of 0.5 microns to 10 microns.

10. The method of claim 6 where the polymeric particles contain melanin-comprised methylmethacrylate ethyleneglycol dimethacrylate copolymer.

11. The method of claim 1 where the melanin is produced from melanin precursors selected from the group of L-dopa, tyrosine, tryptophan, and cysteine.

12. The method of claim 11 where the melanin precursor is L-dopa.

13. The method of claim 1 where the ultraviolet radiation has a wavelength of 250–400 nanometers.

14. The method of claim 13 where the wavelength of the ultraviolet radiation is 320–400 nanometers.

* * * * *